2,783,220

STREPTOMYCIN SALTS

Milton Wolf, Syracuse, N. Y., assignor to Bristol Laboratories Inc., Syracuse, N. Y., a corporation of New York No Drawing. Application November 24, 1953, Serial No. 394,209

9 Claims. (Cl. 260—101)

This invention relates to new and therapeutically useful salts of members of the streptomycin family which exhibit repository action upon injection and, more particularly, to salts of streptomycin, hydroxystreptomycin, and dihydrostreptomycin with levo-pimario-6,8a-(trans and cis) endosuccinic acids.

It has been shown by Schatz, Bugie, and Waksman [Proc. Soc. Exp. Biol. and Med. 55, 66–69 (1944)] that streptomycin is obtained from elaboration products formed in the cultivation of the microorganism *A. griseus* in a suitable medium, by adsorption on activated carbon followed by elution with an acidic solvent. The products which are thus obtained include streptomycin trihydrochloride, $C_{21}H_{39}N_7O_{12} \cdot 3HCl$, and streptomycin sulfate, $(C_{21}H_{39}N_7O_{12})_2 \cdot 3H_2SO_4$. As discovered by Vander Brook et al. [J. Biol. Chem. 165: 463–8 (1946)], an eluting solution of five to ten percent acetone-water containing sufficient sulfuric acid to maintain pH 2.5 during elution is effective. In order to isolate the streptomycin sulfate as a solid material, it is necessary to add more than two volumes of acetone in order to raise the concentration of acetone in the solution to seventy-five percent. The use of such large volumes of solvent is expensive and impractical. As pointed out by Keefer and Anderson (Penicillin and Streptomycin in the Treatment of Infections, Oxford University Press, New York, 1950, page 938), all of the salts of streptomycin complex are biologically active. These salts are extremely soluble in isotonic solutions of sodium chloride or in sterile, pyrogen-free distilled water.

It was found by Peck et al. [J. Amer. Chem. Soc., 67, 1866–1867 (1945)] that the addition of calcium chloride to a methanolic solution of streptomycin trihydrochloride followed by removal of nearly all of the solvent by evaporation gives a solid, complex of formula

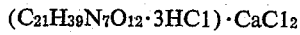

$(C_{21}H_{39}N_7O_{12} \cdot 3HCl) \cdot CaCl_2$ which is also extremely soluble in water.

The salts of streptomycin which are relatively insoluble in water are all salts of organic acids of complex structure and relatively high molecular weight, such as helianthine (p-dimethylamino-phenylazobenzene-sulfonic acid) and orange II (p-(2-hydroxy-1-naphthylazo)-benzene-sulfonic acid). By virtue of their toxicity, these salts are not suitable for therapeutic use.

It has been found e. g. Peck, Hoffhine and Folkers, J. Amer. Chem. Soc. 68, 1390 (1946) that catalytic hydrogenation of an acid salt of streptomycin with the absorption of one mole of hydrogen produces the corresponding salt of dihydrostreptomycin. This product shows equal therapeutic activity but reduced toxicity when compared with streptomycin. Two inorganic salts of dihydrostreptomycin have the formulae $C_{21}H_{41}N_7O_{12} \cdot 3HCl$ and $(C_{21}H_{41}N_7O_{12})_2 \cdot 3H_2SO_4$; both are extremely soluble in water. In the case of dihydrostreptomycin, it has been noted by Fried and Wintersteiner [J. Amer. Chem. Soc. 69, 79–86 (1947)] that the procedure used to form the calcium chloride complex of streptomycin fails to form such a complex when applied to dihydrostreptomycin.

Bogert and Solomons, J. Amer. Chem. Soc., 75, 2355–2356 (1953), have reported several moderately water-insoluble salts of dihydrostreptomycin. Of these, the most insoluble in water was dihydrostreptomycin sulfate iodide, which had a solubility of about 65,250 units/ml. (potency 725γ/mgm.; solubility 90 mgm./ml.). All attempts to prepare analogous water-insoluble salts of streptomycin were unsuccessful.

It is desirable that a salt of streptomycin, hydroxystreptomycin, and dihydrostreptomycin be discovered which is both suitable for therapeutic administration and also relatively insoluble in water. Such insolubility in water facilitates both commercial preparation and certain types of therapeutic use. It is also desirable that such a salt be crystalline and chemically pure, so that it be susceptible to standardization by purely chemical and physical tests.

It is a further object of the present invention to provide a repository form of streptomycin and dihydrostreptomycin, as none is presently available. Thus all present injectable forms of streptomycin and dihydrostreptomycin provide blood levels for only a few hours, showing a peak in the beginning which may be harmfully high followed by a rapid drop. It is an additional object of the present invention to provide for repository use salts of streptomycin and dihydrostreptomycin which are therapeutically active, non-toxic and relatively insoluble in water.

These objectives have been attained and there is now discovered, according to the present invention, a salt of a member selected from the group consisting of streptomycin, hydroxystreptomycin and dihydrostreptomycin with a member selected from the group consisting of levo-pimaric-6,8a-cis-endosuccinic acid and levo-pimaric-6,8a-trans-endosuccinic acid.

Levo-pimaric-6,8a-cis-endosuccinic acid is derived from maleo-pimaric acid and may be prepared according to Waite et al., Chemical Engineering, page 199, February, 1952; the trans isomer is prepared according to Harris, U. S. Patent 2,517,563. Other preparations are given in U. S. Patents 2,039,243 and 2,359,980.

The products of the present invention are prepared by neutralizing the acid with three equivalents of aqueous alkali, e. g. sodium hydroxide, and adding an aqueous solution of a water-soluble salt of streptomycin, hydroxystreptomycin or dihydrostreptomycin, thereby forming and precipitating the salt of the acid with the streptomycin antibiotic. The product is isolated by decanting the aqueous phase or by collection by filtration.

The preferred embodiments of the present invention are the two salts of the formula RX, where R is streptomycin or dihydrosteptomycin and X is levo-pimaric-6,8a-cis-endosuccinic acid. Viewed in its broader aspects, however, this invention includes both the maleic and fumaric acid adducts of pimaric acid, where the pimaric acid is in the naturally-occurring forms or as a racemate or partially racemized. Any other resin acid which may be isomerized to levo-pimaric acid, such as levo-abietic acid, may be used to form a Diels-Alder addition product with maleic anhydride which is then hydrolyzed, often in situ. Thus the invention broadly includes all the optical and stereo isomers of these acids as well as mixtures thereof. The invention also includes the acid and the mixed salts of the formula $R_1R_2R_3X$ where X is one of the above acids, $R_1$ is a streptomycin antibiotic, $R_2$ is a streptomycin antibiotic, hydrogen or one equivalent of a non-toxic cation and $R_3$ is a streptomycin antibiotic, hydrogen or one equivalent of a non-toxic cation.

The following examples will serve to illustrate the invention without limiting it thereto.

EXAMPLE I

Trisodium levo-pimaric-6,8a-cis-endosuccinate (346 g., 0.714 moles) dissolved in 1730 ml. distilled water was added dropwise with vigorous stirring at room temperature over about five hours to a solution of streptomycin sulfate (600.0 g., 0.7063 moles based on 85.8% purity deduced from an average bio-assay of 690 u./mgm. and a corrected maltol assay of 686 u./mgm.). Colorless, solid streptomycin levo - pimaric - 6,8a - cis - endosuccinate formed and precipitated as the product. After stirring overnight, the product was collected by filtration, washed by slurrying with water after grinding, collected and dried in air at room temperature, yielding 592 g. (82.5% yield). Analytical samples dried at 60° C. (13.3% loss of water; 11.6% subsequent pick-up upon re-exposure to moisture; this suggests a heptahydrate formula $C_{45}H_{73}N_7O_{18} \cdot 7H_2O$) exhibited a potency of 506 u./mgm. (theory 540) by bio-assay (subtilis) and a solubility in water by bio-assay of about 540 u./ml. or about one mgm./ml.; a hydrated sample showed $[\alpha]_D^{25} = -32.8°$ (C=0.5 ethylene glycol).

Analysis.—Calculated for $C_{45}H_{73}N_7O_{18}$

|  | Calculated | Found |
|---|---|---|
| C | 54.1 | 54.1, 54.0 |
| H | 7.3 | 7.32, 7.16 |
| Residue |  | 0.74, 0.51 |

The product has a very low toxicity; thus a 2% suspension in 4% aqueous acacia had an $LD_{50}$ in mice of about 970±82 mgm./kg. by intraperitoneal injection and of greater than 1000 mgm./kg. by oral administration.

Single, intramuscular injections in rabbits of 10,000 units/kg. of aqueous suspensions of streptomycin levo-pimaric-6,8a-cis-endosuccinate (one mgm. of this sample contained by assay 438 units of streptomycin base) gave the following blood levels:

| Animal No. | Animal Weight, kg. | Blood Level in units/ml. at specified hours after injection ||||| 48 | 72 |
|---|---|---|---|---|---|---|---|---|
|  |  | 0 | 1 | 4 | 7 | 24 |  |  |
| 975 | 4.3 | NR | 3.1 | 2.2 | 2.0 | .24 | .37 | .14 |
| 976 | 3.0 | NR | 3.0 | 2.5 | 3.0 | .23 | NR | NR |
| 977 | 3.9 | NR | 2.3 | 2.3 | 2.5 | .17 | <.1 | NR |
| 978 | 3.9 | NR | 2.5 | 2.5 | 3.0 | .30 | <.1 | NR |
| 979 | 3.7 | NR | 2.8 | 3.0 | 3.7 | .23 | <.1 | NR |
| 981 | 4.1 | NR | 3.3 | 3.8 | 5.8 | .72 | .12 | NR |
| 985 | 3.4 | NR | 5.4 | 4.7 | 5.0 | .53 | <.1 | NR |
| 986 | 3.7 | NR | 4.6 | 3.8 | 4.8 | .53 | .39 | NR |
| 987 | 3.5 | NR | 2.9 | 2.3 | 2.3 | .20 | <.1 | NR |
| 988 | 2.8 | NR | 2.9 | 2.4 | 3.0 | .19 | NR | NR |
| Average |  |  | 3.28 | 2.95 | 3.5 | 0.33 |  |  |

Single intramuscular injections in rabbits of 10,000 units/kg. of aqueous solutions of streptomycin sulfate, for purposes of comparison, gave the following blood levels:

| Animal No. | Animal weight, kg. | Blood level in units/ml. at specified hours after injection |||||
|---|---|---|---|---|---|---|
|  |  | 0 | 1 | 4 | 7 | 24 |
| 140 | 2.3 | NR | 23 | 2.7 | 0.48 | NR |
| 141 | 2.3 | NR | 19 | 1.4 | 0.30 | NR |
| 142 | 2.3 | NR | 18 | 1.2 | 0.36 | NR |
| 143 | 2.4 | NR | 18 | 2.1 | 0.59 | NR |
| 994 | 3.1 | NR | 22 | 2.1 | 1.3 | NR |
| Average |  |  | 20 | 1.9 | 0.61 |  |

NR means no reading, that is, no activity; blood levels determined by *B. subtilis* plate assays on blood samples.

EXAMPLE II

Trisodium levo-pimaric-6,8a-cis-endosuccinate 12.0 g.) dissolved in 60 ml. water is added dropwise with vigorous stirring to a solution of dihydrostreptomycin sulfate (20.0 g.) in 100 ml. water. The addition is carried out at room temperature over a period of about 25 minutes. The product, dihydrostreptomycin levo-pimaric-6,8a-cis-endosuccinate, is formed, separates as a solid or glassy gum and is isolated by filtration or decantation and found to be active by bio-assay and to be insoluble in water.

EXAMPLE III

Trisodium levo - pimaric - 6,8a - cis - endosuccinate (12.0 g.) dissolved in 60 ml. water is added dropwise with vigorous stirring to a solution of hydroxystreptomycin sulfate (20.0 g.) in 100 ml. water. The addition is carried out at room temperature over a period of about 25 minutes. The product, hydroxystreptomycin levo-pimaric-6,8a-cis-endosuccinate, is formed, separates as a solid or glassy gum and is isolated by filtration or decantation and found to be active by bio-assay and to be insoluble in water.

EXAMPLE IV

Trisodium levo - pimaric - 6,8a - trans -endosuccinate (12.0 g.) dissolved in 60 ml. water is added dropwise with vigorous stirring to a solution of dihydrostreptomycin sulfate (20.0 g.) in 100 ml. water. The addition is carried out at room temperature over a period of about 25 minutes. The product, dihydrostreptomycin levo-pimaric-6,8a-trans-endosuccinate, is formed, separates as a solid or glassy gum and is isolated by filtration or decantation and found to be active by bio-assay and to be insoluble in water.

EXAMPLE V

Trisodium levo - pimaric - 6,8a - trans - endosuccinate (12.0 g.) dissolved in 60 ml. water is added dropwise with vigorous stirring to a solution of hydroxystreptomycin sulfate (20.0 g.) in 100 ml. water. The addition is carried out at room temperature over a period of about 25 minutes. The product, hydroxystreptomycin levo-pimaric-6,8a-trans-endosuccinate, is formed, separates as a solid or glassy gum and is isolated by filtration or decantation and found to be active by bio-assay and to be insoluble in water.

EXAMPLE VI

Trisodium levo - pimaric - 6,8a - trans - endosuccinate (12.0 g.) dissolved in 60 ml. water is added dropwise with vigorous stirring to a solution of streptomycin sulfate (20.0 g.) in 100 ml. water. The addition is carried out at room temperature over a period of about 25 minutes. The product, streptomycin levo - pimaric - 6,8a-trans-endosuccinate, is formed, separates as a solid or glassy gum and is isolated by filtration or decantation and found to be active by bio-assay and to be insoluble in water.

Inasmuch as the foregoing specification comprises preferred embodiments of the invention, it is to be understood that variations and modifications may be made therein in accordance with the principles disclosed, without departing from the scope of the invention, which is to be limited solely by the appended claims.

I claim:

1. A salt of a member selected from the group consisting of streptomycin, hydroxystreptomycin and dihydrostreptomycin with a member selected from the group consisting of levo-pimaric-6,8a-cis-endosuccinic acid and levo-pimaric-6,8a-trans-endosuccinic acid.

2. Streptomycin levo-pimaric-6,8a-cis-endosuccinate.

3. Dihydrostreptomycin levo-pimaric-6,8a-trans-endosuccinate.

4. Dihydrostreptomycin levo-pimaric-6,8a-cis-endosuccinate.

5. Streptomycin levo-pimaric-6,8a-trans-endosuccinate.

6. Hydroxystreptomycin levo - pimaric - 6,8a - cis-endosuccinate.

7. The process of mixing in substantially aqueous solution substantially equimolar amounts of a water-soluble salt of a streptomycin antibiotic and a water-soluble salt of pimaric-6,8a-endosuccinic acid to produce and precipitate the corresponding salt of a member selected from the group consisting of streptomycin, hydroxystreptomycin and dihydrostreptomycin with a member selected from the group consisting of levo-pimaric-6,8a-cis-endosuccinic acid and levo-pimaric-6,8a-trans-endosuccinic acid and recovering said salt.

8. The process of mixing in substantially aqueous solution substantially equimolar amounts of a water-soluble salt of streptomycin and a water-soluble salt of levo-pimaric-6,8a-cis-endosuccinic acid to produce and precipitate streptomycin levo-pimaric-6,8a-cis-endosuccinate and recovering said salt.

9. The process of mixing in substantially aqueous solution substantially equimolar amounts of a water-soluble salt of dihydrostreptomycin and a water-soluble salt of levo-pimaric-6,8a-cis-endosuccinic acid to produce and precipitate dihydrostreptomycin levo-pimaric-6,8a-cis-endosuccinate and recovering said salt.

References Cited in the file of this patent

UNITED STATES PATENTS

| | | |
|---|---|---|
| 2,481,267 | Walti | Sept. 6, 1949 |
| 2,498,574 | Peck | Feb. 21, 1950 |

OTHER REFERENCES

Journal of Bacteriology, vol. 60, pp. 269–274 (1950).